United States Patent [19]

McMurtry et al.

[11] Patent Number: 5,208,994

[45] Date of Patent: May 11, 1993

[54] STYLUS COUNTERBALANCING MECHANISM FOR A MEASURING PROBE

[75] Inventors: David R. McMurtry, Wotton-Under-Edge; Stephen E. Lummes, Stroud, both of United Kingdom

[73] Assignee: Renishaw Metrology Limited, Gloucestershire, United Kingdom

[21] Appl. No.: 864,355

[22] Filed: Apr. 6, 1992

[30] Foreign Application Priority Data

Apr. 12, 1991 [GB] United Kingdom ................. 9107825

[51] Int. Cl.⁵ .............................................. G01B 7/28
[52] U.S. Cl. ..................................................... 33/561
[58] Field of Search ................. 33/556, 557, 558, 559, 33/560, 561

[56] References Cited

U.S. PATENT DOCUMENTS 3,742,610  7/1973  Calame ............................. 33/561 X
3,869,799  3/1975  Never et al. ........................ 33/561
4,937,948  7/1990  Herzog et al. .

Primary Examiner—Harry N. Haroian
Attorney, Agent, or Firm—Oliff & Berridge

[57] ABSTRACT

A stylus counterbalancing mechanism for a probe includes a stylus support member suspended on a resilient suspension system and connected to a spring which provides a force to counterbalance the weight of the stylus. The spring is connected to one end of a plate which is capable of sliding up and down a rod but is locked in position due to the clockwise moment produced by the spring force. The plate is unlocked from its position, when required, by movement of an actuating member. The actuating member is slidable up and down the rod and has bearing areas arranged to provide an anti-clockwise moment to the plate to unlock it and to move it along the rod to increase or decrease the spring force as required.

In the probe, the actuating member includes a projection extending through the probe housing to be operable from the outside either manually or by the co-ordinate positioning machine, the machine being programmed to move the probe to engage the projection with a fixed ledge on the machine.

4 Claims, 2 Drawing Sheets

STYLUS COUNTERBALANCING MECHANISM FOR A MEASURING PROBE

BACKGROUND OF THE INVENTION

The present invention relates to a stylus counterbalancing mechanism for a probe.

In measuring probes, in particular analogue measuring probes, in which the probe stylus is mounted on a spring suspension system within the probe itself, a problem arises when the probe stylus is changed for one of different weight, in that the change in weight can cause a deflection of the stylus mounting mechanism. The effect is a change in the zero position of the stylus requiring a re-calibration of the probe.

The more sensitive the probe is, the greater can be the effect of different weights of styli, to the extent that a heavy stylus can so deflect the stylus mounting, that all of the travel of the stylus which is required for making measurements can be used up.

A related problem occurs in touch trigger probes which have a mechanical rest position, in that changing the weight of the stylus changes the force required to move it from the rest position, which in turn will vary the pre-travel of the stylus, i.e. the amount of movement of the stylus tip before a signal relating to stylus movement is generated. These problems are well-known and various types of stylus counterbalancing mechanisms are known. These range from manual mechanisms for changing the compression of a spring which forms part of the stylus mounting, to fully automated mechanisms such as are described, for example, in U.S. Pat. No. 4,937,948.

In the above-mentioned patent specification there is described a stylus counterbalancing mechanism which comprises a pair of springs connected to a flange on a movable part of the stylus support. The measuring transducers within the probe are set to read zero when the attached stylus is out of contact with a workpiece. If the stylus is removed and a new one of different weight attached, the measuring transducers will read a positive or negative deflection. This change is used to generate a signal, which is used, in turn, to drive a motor in the appropriate sense to move the stylus support to bring the reading of the measuring transducers back to zero.

While the above-described mechanism provides for automatic adjustment of the stylus support for counterbalancing stylus weight, it adds the complication and expense of a motor and its control system within the probe. The motor also generates heat within the probe during its operation which is a disadvantage.

SUMMARY OF THE INVENTION

An object of the present invention is to provide a counterbalancing mechanism for a stylus in a measuring probe, operation of which can be automated but which does not depend on motors within the probe.

The invention fulfils this object by providing in a probe having a stylus, a counterbalancing mechanism within the probe which is actuated by actuating means extending through to the outside of the probe and which may be actuated manually or which may be moved by a machine (to which the probe is fitted) into engagement with a feature on the machine or a workpiece to cause actuation thereof as part of a set-up routine of the machine.

More specifically the stylus counterbalancing mechanism may comprise actuating means, resilient means connected between the actuating means and the stylus-support member for applying a force to the stylus support member in opposition to the weight of the stylus, said actuating means comprising an actuating member within the probe housing and which is movable between positions in which the resilient means exerts a greater or lesser force on the stylus-support member, releasable locking means for locking the actuating member in any of said positions after a movement thereof, and a projection extending from the actuating member through the housing to be operable from the outside of the probe for moving the actuating member.

The movement of the movable member may be a pivoting or sliding movement.

In a preferred embodiment of the present invention the actuating means comprises a plate movable along a rod which passes through a hole or a slot in the plate, the resilient means comprises a spring spaced from one side of the rod and connecting the plate to a movable part of the stylus support, and the actuating member having bearing areas at least two of which confront the plate in opposite directions on opposite sides of the rod, said bearing areas acting on the plate when the actuating member is moved in either direction to move the plate along the rod.

In the above-described preferred embodiment the spring provides both a counterbalancing force for the stylus and a force acting to lock the plate on the rod. In alternative embodiments the locking force may be provided by means separate from the spring.

The invention includes a probe in which the counterbalancing mechanism is used, and is not restricted to an analog probe design. Spring force adjusters are also used in touch trigger probes and which could be automated by the use of a design in accordance with the present invention.

The invention also includes a co-ordinate positioning machine for example, a measuring machine or machine tool on which a probe with a stylus counterbalancing mechanism of the present invention is mounted, and which includes a normally fixed lip shaped to engage the actuating means of the probe, and control means for driving the machine to bring the actuating means into engagement with the ledge to cause the required movement of the actuating means to vary the counterbalancing force of the resilient means.

BRIEF DESCRIPTION OF THE DRAWINGS

The invention will now be more particularly described, by way of example only, with reference to the accompanying drawings in which.

DETAILED DESCRIPTION OF PREFERRED EMBODIMENTS

Figure 1:
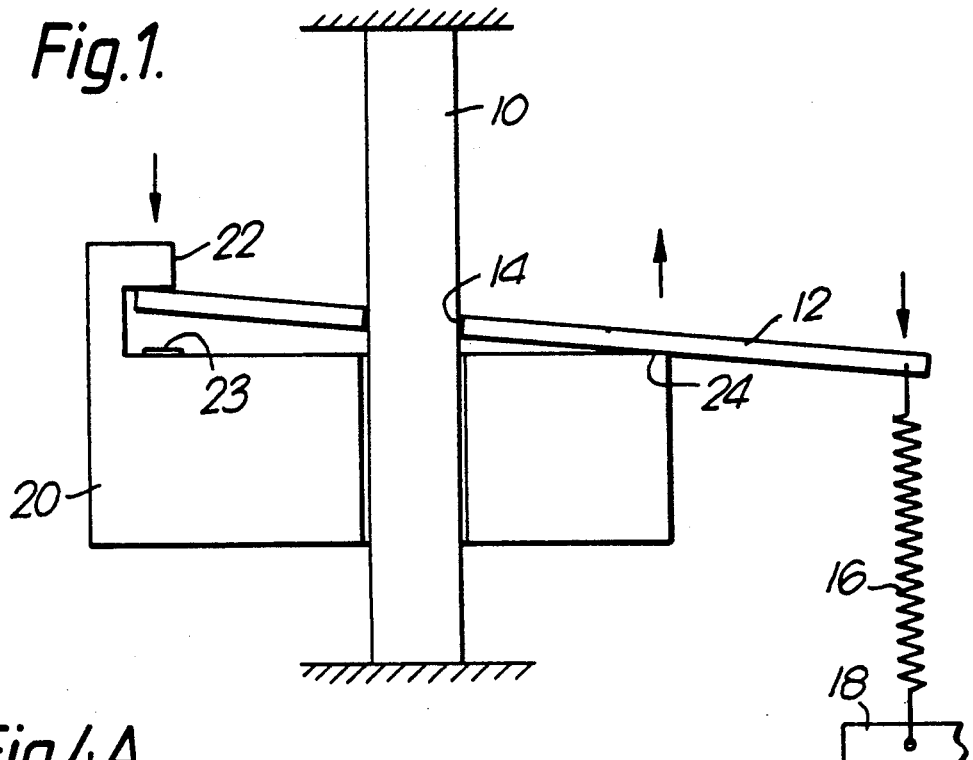
FIG. 1 is a diagrammatic illustration of the operating principle of one embodiment of the stylus counterbalancing mechanism of the present invention.

Referring now to the drawings, FIG. 1 shows diagrammatically the basic elements of a stylus counterbalancing mechanism of the present invention.

A rod 10 is provided which is straight and fixed in position. A member 12, shown in this example as a plate, is positioned to slide along the rod, for which purpose it has an aperture 14 which may be a circular hole or a slot dimensioned to be a sliding fit around the rod. At one end of the plate resilient means, shown in this example as a tension spring 16, connects the plate to the movable stylus support member 18 to provide the force required to counterbalance at least a part of the stylus weight.

The spring acting only on one end of the plate (the right hand end as shown) tilts the plate, and thus applies a clockwise couple to the plate which causes locking of the rod against the wall of the aperture 14 to inhibit sliding of the plate along the rod.

In order to allow movement of the plate along the rod in either direction, an actuating member 20 is provided which is mounted for sliding movement along the rod. The member 20 has two oppositely facing bearing areas 22 and 24 which are arranged to contact the plate on opposite sides of the rod. Depending on the direction of movement of the actuating member, one or other of the baring areas will contact the plate and apply an anti-clockwise couple to the plate. This causes the plate to pivot about one or other of the side-walls of the aperture to counter the locking action of the spring, and allow movement of the plate along the rod.

Thus it can be seen that if, for example, a heavier stylus is connected to the stylus support causing a downward movement of the support member 18, the plate can be moved upwards along the rod by the actuating member to pull the support upwards and restore the stylus support to the central position within its vertical movement range.

A third bearing area 23 is provided on the same side of the member 20 as the bearing area 22. This bearing area is at the same horizontal level as, or slightly higher than, the bearing area 24 and faces in the same direction. The bearing area 23 only comes into use n circumstances in which the plate has been moved downwardly to the extent that the spring 16 is fully compressed, and the plate becomes tilted so that it slopes upwardly from left to right in FIG. 1. The spring 16 may then be providing an anti-clockwise movement to the plate.

In these circumstances in the absence of a bearing surface 23 when member 20 is moved upwardly and bearing area 24 applies an anti-clockwise moment to the plate it will remain locked. The bearing area 23 is arranged therefore to contact the plate before bearing area 24, and to apply a clockwise moment to the plate. The clockwise moment unlocks the plate and is maintained during the upward movement of member 20 until the spring is once again in tension and tilts the plate the opposite way when bearing area 24 will again be in contact with the plate.

Figure 2:
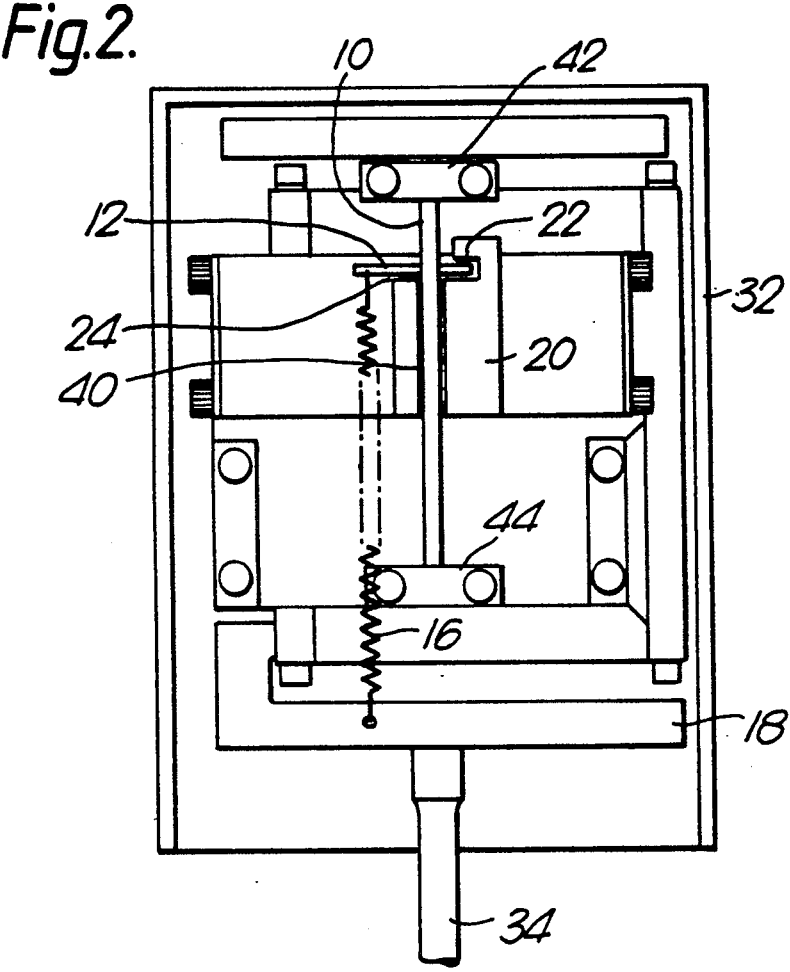
FIG. 2 is an elevation of a measuring probe with the front wall removed showing the counterbalancing mechanism of FIG. 1 incorporated into the probe.
Figure 3:
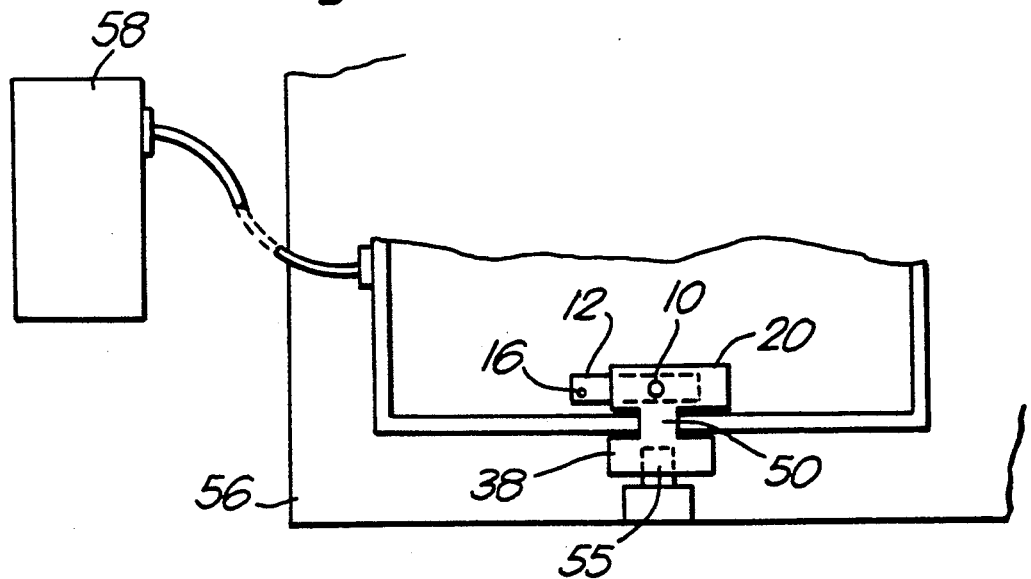
FIG. 3 is a part-sectional plan view of FIG. 2, and FIGS. 4A and 4B are respectively an enlarged end view and side elevation of the actuating member of the stylus counterbalancing mechanism of FIGS. 2 and 3.

FIGS. 2 and 3 show how the above-described counterbalancing mechanism is incorporated into the structure of an analogue probe in a manner such as to allow manual operation of the mechanism from outside of the probe, or automated movement of the actuating member by a machine on which the probe is mounted during an initial setting-up or datuming sequence.

Referring now to FIGS. 2 and 3, a probe 30 is shown having an outer housing 32 within which is contained a suspension mechanism for the stylus support member 18 which supports a stylus 34. The suspension mechanism may be of any suitable type, for example, a spring parallelogram system as shown in our earlier UK patent specification No. 1,551,218 which allows movement of the stylus support member in three orthogonal linear directions. Since the type of suspension is not an essential feature of the present invention it is not described in detail in this specification. Similarly, measurement transducers are provided within the probe to measure the movements of the stylus holder in all three linear directions, and these transducers may be of any convenient type for example, opto-electronic scales and read-heads, or capacitative or inductive sensors, and are not described in detail. Suffice to say that movements of the stylus holder in all three linear directions are accurately measured in known manner over a small measuring range of say ±1.5 mm to enable measurements of a workpiece surface to be made.

In order to obtain high resolution of the probe measurements the suspension system has to be sensitive to small stylus deflections. Also, to provide flexibility in the types of measurements made and surfaces to be measured different styli may be needed. Provision is therefore made for changing styli, for example using a stylus changer as described in our International Patent Publication WO89/05210.

Styli of different weights will cause different initial deflections of the stylus support member 18, and since the range of movement is limited, the initial deflection needs to be compensated to allow the full range of movement to be used for measurement purposes. The stylus counterbalancing mechanism of the present invention is therefore provided, in this example, on the axis of movement which is parallel to the axis of the stylus 34, i.e. the vertical axis.

One side of the probe housing has a slot 36 cut in it to allow the actuating means to extend therethrough. The actuating means in this example includes the member 20 and an external projection 38 which can be used by the machine for causing movement of the actuating member in either direction along the slot 36.

The rod 10 extends vertically adjacent the inner wall of the probe housing in line with the slot 36, and is aligned with a recess 40 in the actuating member 20 in which the rod 10 is a clearance fit. The plate 12 fits over the rod by virtue of the aperture 14, in the plate and the spring 16 is connected between one end of the plate and the stylus support member 18. The aperture 14 is shown as a circular hole but it may take the form of a slot.

To assemble the mechanism the actuating member 20 is fitted into the slot 36 in the housing with the plate 12 in position between the bearing areas 22,23 and 24. The rod is passed through the aperture 14 and into the recess 40 of the actuating member, and then blocks 42 and 44 are fitted over the ends of the rod and screwed to the probe housing thus locking the assembly in position. Finally the spring 16 is connected between the plate and the stylus support member 18 to lock the plate on the rod. The rate of the spring is relatively low so that it does not significantly effect the spring suspension system for the stylus.

When it is desired to move the plate along the rod to position the stylus support member in the center of the movement range, the projection 38 on the outside of the probe is moved in the desired direction. The respective bearing area 22 or 24 will contact the plate to apply the required couple to release the locking action of the spring and move the plate along the rod.

Figure 4A:
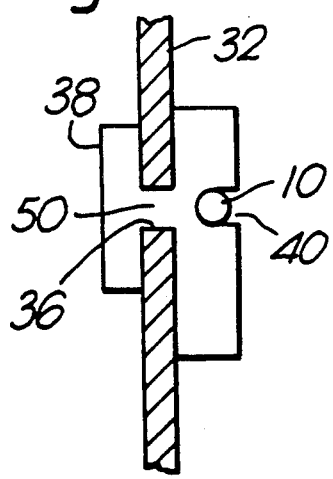
Figure 4B:
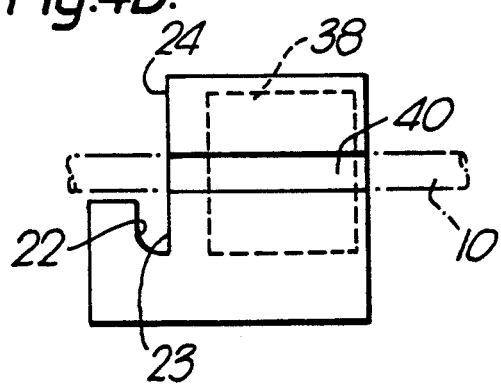

Referring now to FIGS. 4A and 4B the shape of the actuating member can be more clearly seen. The projection 38 is square and is connected to the rest of the member by a narrow neck 50 dimensioned to be a sliding fit in the slot 6 in the housing wall 32. The recess 40 is dimensioned to accept the rod 10. FIG. 4B shows more clearly the bearing areas 22,23 and 24 of the actuating member which co-operate with the plate 12.

The stylus counterbalancing mechanism described above can be operated either manually or by a programmed sequence of movements of the machine on which the probe is mounted. For automated operation, a small lip or ledge needs to be available on the machine, which may be a feature of a workpiece being measured, but is preferably a feature specifically provided at a known location at the extremity of the working volume of the machine. A ledge 55 is shown diagrammatically in FIG. 3 mounted on the base 56 of a machine. The ledge 55 is nominally fixed in position but will preferably be capable of bending or otherwise moving out of the way in the event that due to some fault the machine applies an excessive force thereto, to prevent damage to the probe.

To set the probe up initially it is necessary to be able to establish precisely a datum position of the stylus, either by a known mechanical stop arrangement at one end of the stylus travel, or by a reference position on the measuring transducer. At this known position the reading of the measuring transducer on the vertical axis is noted. The machine is programmed by its controller 58 to position the probe with the projection 38 in contact with the ledge 55, and to drive either upwards or downwards until the reading of the measurement transducer shows that the stylus support member is in the center of its range of movement. The transducer reading is set to zero at this point and as soon as any upward or downward force on the projection ceases the plate will be locked by the action of spring 16 in the new position.

When the stylus is replaced with another one of a different weight, the deflection of the suspension system will change, and the reading of the measuring transducer in the non-workpiece contacting position, or zero position, of the stylus support member, will cease to be zero. The machine is programmed under these circumstances to drive the probe to the ledge, engage the projection 38 with the ledge, and drive the probe in the appropriate direction to zero the measuring transducer, at which point the stylus support mechanism will have been returned to the center of its movement range.

Thus the invention provides an extremely simple, machine-operable mechanism for counterbalancing stylus weight which avoids the use of motors in the probe, and which locks accurately into any new position without slip.

Although the invention has been described with reference to a stylus counterbalancing mechanism operable on the vertical axis, i.e. in line with a vertically mounted stylus, the same principle may be employed to design a counterbalance mechanism to operate to balance the deflection of the stylus in either of the horizontal directions should it be required to mount the probe in a horizontal position. The axis of the counterbalancing mechanism will then be aligned to the direction of gravity, e.g. the x or y axis of the probe.

Various alternative designs may be used falling within the general concept of the present invention. For example, instead of using the spring 16 to act both to provide the locking force and the counterbalance force, the actuating means may include, a separate locking system, for example in the form of a spring loaded brake pad carried by the member 20 and urged into contact with the rod 10.

Figure 5:
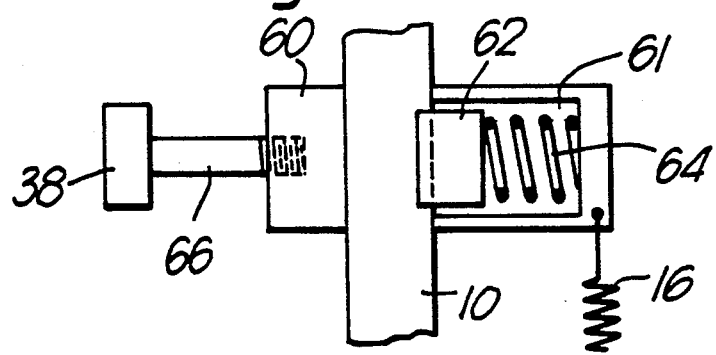
FIG. 5 is an illustration of the principle of operation of an alternative embodiment of the invention.

FIG. 5 illustrates the essential features of this embodiment. The plate 12 is dispensed with and the spring 16 is connected directly to the actuating member. The actuating member is a block 60 which slides on rod 10 and in which is formed a cavity 61 containing a brake pad 62 urged by a spring 64 into contact with the rod 10. A rod 66 screwed into the block extends through the probe body and carries the projection 38 which completes the actuating means.

In this design the frictional force created by the spring loaded plunger has to be sufficient always to exceed the force of the spring 16 in order to lock the block 60 on the rod, and the thickness of the block together with the positioning of the spring must be such as to avoid the tendency of the block to jam on the rod.

To reduce the vertical forces required to be applied to the projection 38 to move the block, in a modification (not shown) the rod 66, instead of being screwed into the block, may be arranged to be movable inwards to disengage the brake from the rod when movement of the block is required.

In another embodiment, instead of sliding movement to increase or decrease the spring force, the spring may be attached by a lever arm to a pivoting block, mounted on a fixed pivot and operated from outside of the probe by a lever or screw.

What is claimed is:

1. A probe for use with a co-ordinate positioning machine, the probe having a housing, a stylus support member movably mounted within the housing to which may be attached different styli and a counterbalancing mechanism for counterbalancing at least part of the weight of the stylus, said mechanism comprising actuating means and resilient means connected between the actuating means and the stylus-support member for applying a force to the stylus support member in opposition to the weight of the stylus, said actuating means comprising an actuating member within the probe housing and which is movable between positions in which the resilient means exerts a greater or lesser force on the stylus-support member, releasable locking means for locking the actuating member in any of said positions after a movement thereof, and a projection extending from the actuating member through the housing to be operable from the outside of the probe to release said locking means and move the actuating member.

2. A probe as claimed in claim 1, characterized in that said counter balancing mechanism further comprises a rod (10) fixed within the probe and having a longitudinal axis lying parallel to the longitudinal axis of a stylus on the stylus support, the actuating means (12,20;60-66) being slidable along the rod (1) to vary the force of the resilient means.

3. A probe as claimed in claim 2, characterized in that the actuating means further includes a plate (12) slidable along the rod (10), the resilient means comprising a spring (16) attached between the plate (12) and the stylus support (18) at a position spaced to one side of the axis of the rod whereby a turning moment is produced on the plate by the resilient means to lock the plate in position on the rod, the actuating member (20) including bearing areas (22-24), at least two of which (22,24) confront the plate (12) in opposite directions on opposite sides of the rod (10), said bearing areas acting on the plate when the actuating means is moved in either direction to free the plate from the locking action of the spring and move the plate along the rod.

4. A co-ordinate positioning machine including a spindle movable under the control of a control system and to which is connected a probe, the probe having a housing, a stylus support member movably mounted within the housing to which may be attached different styli and a counterbalancing mechanism for counter balancing at least part of the weight of the stylus, said mechanism comprising actuating means, and resilient means connected between the actuating means and the stylus-support member for applying a force to the stylus support member in opposition to the weight of the stylus, said actuating means comprising an actuating member within the probe housing and which is movable between positions in which the resilient means exerts a greater or lesser force on the stylus-support member, releasable locking means for locking the actuating member in any of said positions after a movement thereof, and a projection extending from the actuating member through the housing to be operably from the outside of the probe for moving to release said locking means and move the actuating member, and wherein a ledge is provided on the machine, the ledge being shaped to be engaged by the actuated means of the probe, the control means being programmed to drive the machine spindle to bring the actuating means into engagement with the ledge to cause the required movement of the actuating means to vary the counterbalancing force of the resilient means.

* * * * *